(No Model.) 2 Sheets—Sheet 1.

C. F. ROOD.
SAWING MACHINE.

No. 603,541. Patented May 3, 1898.

Witnesses
C. W. Miles
Oliver B. Kaiser

Inventor
Charles F. Rood
by Wood Boyd
Attorneys (No Model.) 2 Sheets—Sheet 2.
C. F. ROOD.
SAWING MACHINE.
No. 603,541. Patented May 3, 1898.
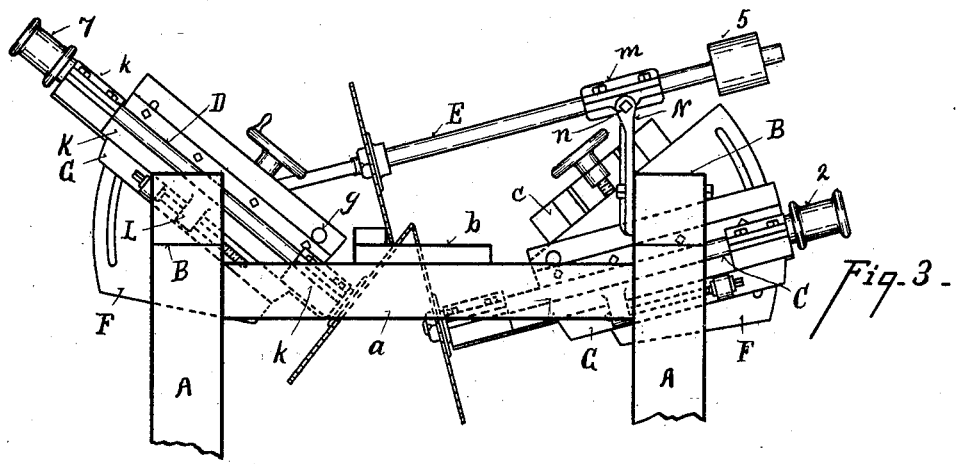
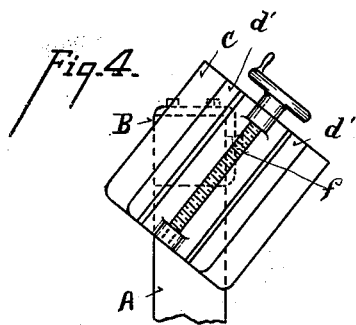
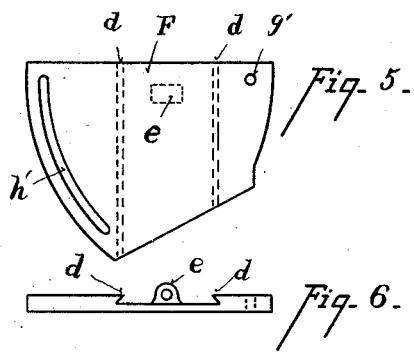
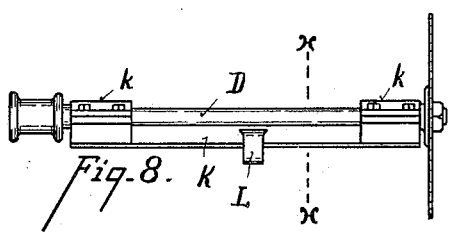
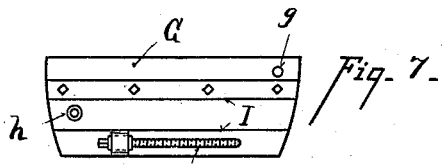
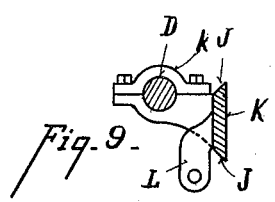
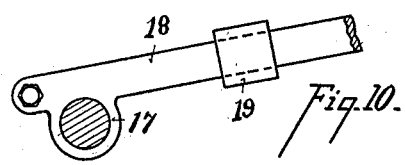
Witnesses
C. W. Miles
Oliver B. Kaiser
Inventor
Charles F. Rood
By Wood Bond
Attorney
THE NORRIS PETERS CO., PHOTO-LITHO., WASHINGTON, D. C.

UNITED STATES PATENT OFFICE.

CHARLES F. ROOD, OF FORD, KENTUCKY.

SAWING-MACHINE.

SPECIFICATION forming part of Letters Patent No. 603,541, dated May 3, 1898.

Application filed November 3, 1897. Serial No. 657,277. (No model.)

*To all whom it may concern:*

Be it known that I, CHARLES F. ROOD, residing at Ford, in the county of Clark and State of Kentucky, have invented certain new and useful Improvements in Sawing-Machines, of which the following is a specification.

The object of my invention is to provide a set of gang-saws which can cut V-shaped roofing-struts at a single operation.

Another object of my invention is to provide a gang of saws which can simultaneously cut two V-shaped strips at a single operation.

Another object of my invention is to provide means for adjusting any one or all of the gang of saws to various angles.

The features of my invention are more fully set forth in the description of the accompanying drawings, making a part of this specification, in which—

Figure 1:
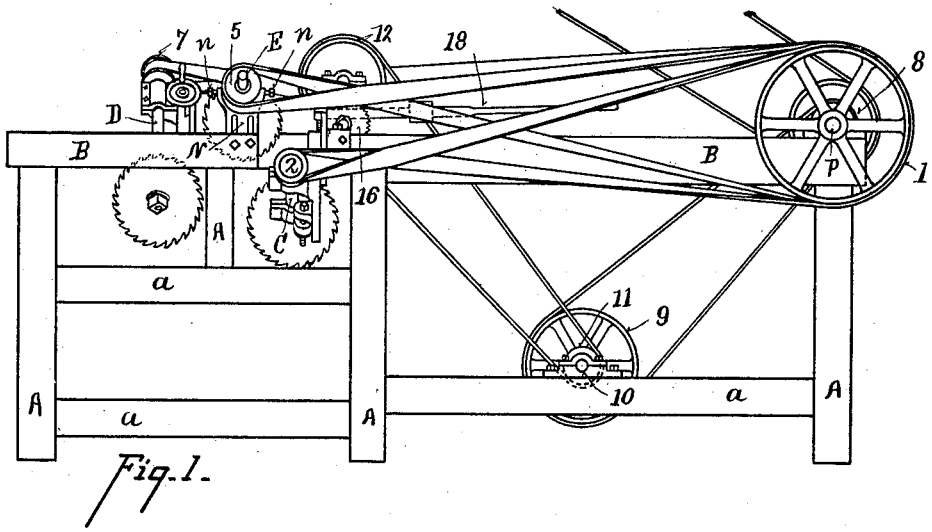
Figure 2:
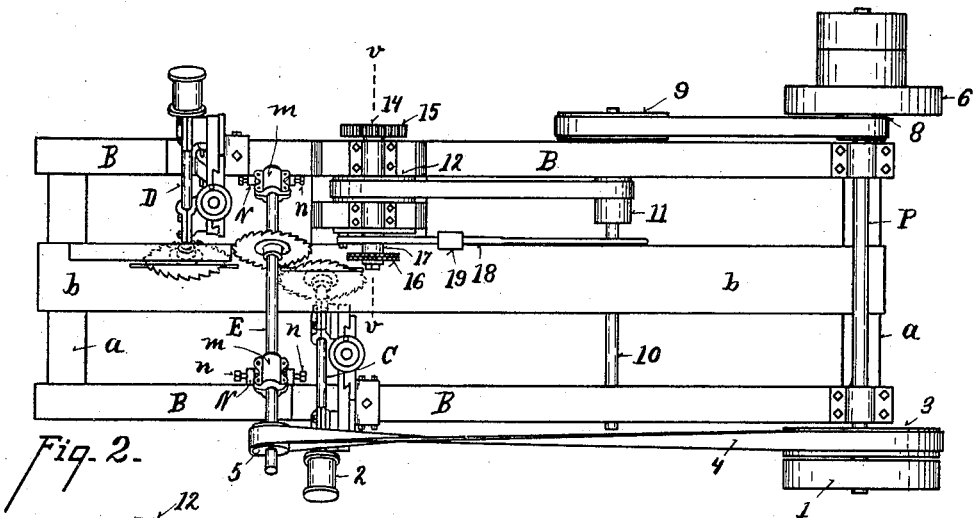
Figure 12:
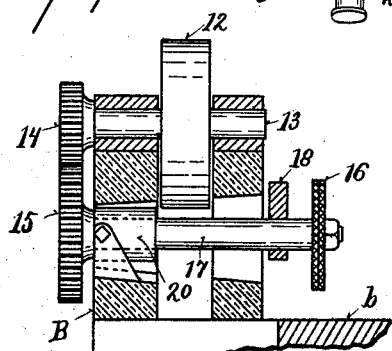
Figure 11:
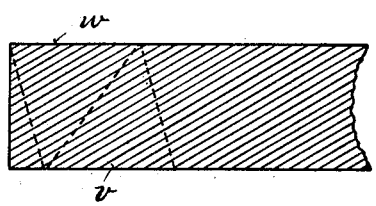

Figure 1 is a side elevation of my improvement. Fig. 2 is a top plan view of the same. Fig. 3 is a rear elevation showing the position of the angle-saws. Fig. 4 is a detailed view of the means for vertically adjusting the saw-arbor. Fig. 5 is a plan view of one of the angle-adjusting plates. Fig. 6 is a side elevation of Fig. 5. Fig. 7 is a plan view of the other adjusting-plate. Fig. 8 is a side elevation of the saw-arbor and its adjustable journal-box. Fig. 9 is a section on line $x\,x$, Fig. 8. Fig. 10 is a detailed view of the tension device. Fig. 11 is an enlarged diagram representing the line of saw-kerfs when cutting two V-shaped strips. Fig. 12 is an enlarged detail section on line $v\,v$, Fig. 2.

A represents the posts, $a$ the longitudinal frame-pieces, and B the top plates, of the frame.

$b$ represents the table for supporting the material to be worked. It may be stationary or movable, as desired. I have shown three saws in the gang.

C represents the arbor of the front saw, D the arbor of the rear saw, and E the arbor of the central or upper saw. The front and rear saw-arbors are supported and adjusted in the same manner, and a description of one of these devices is applicable to the other.

$c$ represents a plate rigidly attached to the frame B.

F represents a guide-plate provided with ways $d$, moving on a corresponding tongue $d'$ on plate $c$.

$e$ represents an ear on guide-plate F, in which taps the screw $f$, which moves plate F vertically on plate $c$.

G represents a coacting adjusting-plate which is swiveled to plate F by a pivot $g$, turning in the center $g'$.

$h$ represents a stud projecting into segmental groove $h'$ for the angular adjustment of the saw-arbor. The screw $f$, when turned, adjusts plate F on plate $c$ vertically. When plate G is adjusted on plate F angularly, in order to hold said plate to its adjusted position, a clamping-nut is provided on stud $h$, which when loosened allows the guide-plate G to swivel on its pivot to the desired location on plate F, when it is again clamped in position. It is desired also to adjust the saw-arbor longitudinally on its axis. To accomplish this, I provide a pillow-block K.

$k$ represents the journal-boxes, rigidly connected to the pillow-block. This pillow-block is provided with dovetailed ways J, which fit and move in a corresponding way I on plate G.

L represents a depending shank or arm on pillow-block K, into which taps the adjusting-screw $l$. When this is turned, it moves the pillow-block longitudinally on plate G and adjusts the saw longitudinally in the line of its axis. Thus the saw is adjusted vertically by means of the screw $f$, and it is adjusted angularly by the swiveling plate G and longitudinally by moving the pillow-block longitudinally on plate G. The rear saw is constructed and mounted in the same manner.

The top and central saw is adjusted, preferably, into parallel plane with the front saw and at an angle to the rear saw, and when adjusted as shown in Fig. 3 the saws will cut two V-shaped strips $v\,w$ from the material on table $b$, presented to the action of the saws. This top saw is supported in journal-boxes $m$, which are gimbaled to pillow-blocks N by gimbal-screws $n$, the points of which form centers for the journal-boxes. This saw is adjusted longitudinally upon its arbor and may be adjusted vertically by sliding brackets N vertically on frame B or in any other suitable manner.

The saw may also be adjusted angularly by raising or lowering either one or the other of the brackets N.

P represents the main driving-shaft.

1 represents the pulley for driving-pulley 2, which is mounted on the saw-arbor C.

3 represents a driving-pulley; 4, a belt traveling on pulley 5 for driving the arbor of the upper saw.

6 represents a driving-pulley for driving pulley 7 of the rear saw-arbor D.

8 9 represent pulleys driving a countershaft 10.

11 12 represent pulleys for driving shaft 13 and through gears 14 15 the revolving feeder 16 on shaft 17, which bears on the top of the material and feeds it to the action of the saws.

It will be observed that the gang of saws may be adjusted to any desired angles and to cut plain as well as bevel-shaped work, and triangular as well as square pieces may be cut upon the same machine.

It is necessary to raise and lower the feed for different thicknesses of material, and this is accomplished as follows: Shaft 17 is hung on a single swivel-box 20, which allows shaft 17 at its inner end to move up and down. 18 represents a lever strapped to shaft 17 and pivoted to the frame of the machine. 19 represents a weight sliding on said lever to regulate the degree of pressure. Thus the feeder 16 will be raised or lowered vertically to accommodate itself to the thickness of material being sawed.

It is obvious that when a single piece is to be sawed two of either of said saws may be employed. It will also be manifest that the upper cutting edges of the saws hung on arbors C D may be adjusted to pass each other as well as to intercept at the apex of the cut.

The saws can easily and quickly be adjusted while running to different sizes and angles. The said saws can also be adjusted to cut two right-angle strips from a single piece at one operation.

Having described my invention, I claim—

1. In a sawing-machine, the combination with the front and rear arbors C and D, and their saws arranged in planes at an angle to one another, of means for adjusting said arbors longitudinally, angularly and vertically, an intermediate arbor and its saw, and means for vertically and angularly adjusting said intermediate saw-arbor independently of the front and rear arbors, substantially as described.

2. In a sawing-machine, the combination with the machine-frame, of the fixed plates c secured to the frame and having straight, vertically-inclined ways, the ways of one plate converging toward the ways of the other plate, the plates F arranged to slide longitudinally in said ways, the plates G pivotally mounted at one end on the plates F, means for fastening the free ends of the plates G to the plates F, pillow-blocks arranged to move longitudinally in ways on the plates G and provided with journal-boxes, and saw-arbors journaled in said boxes and provided with saws, substantially as described.

3. In a sawing-machine, the combination with the machine-frame, of the fixed plates c secured to the frame and having straight, vertically-inclined ways, the ways of one plate converging toward the ways of the other plate, the plates F arranged to slide longitudinally in said ways, means for adjusting the plates F in their ways, plates G pivotally attached to the plates F and provided with ways, means for adjusting the plates G about their pivots, pillow-blocks arranged to move longitudinally in the ways on the plates G and provided with journal-boxes, saw-arbors journaled in said boxes, saws mounted on the arbors, and means for adjusting the pillow-blocks in their ways, substantially as described.

4. In a sawing-machine, the combination with the machine-frame, of the fixed plates c secured to the frame and having straight, vertically-inclined ways, the ways of one plate converging toward the ways of the other plate, the plates F arranged to slide longitudinally in said ways and having threaded ears e, screws f journaled in bearings on the plates c and engaging said ears to adjust the plates F vertically, plates G pivotally attached to the plates F and having studs h arranged to travel in segmental slots h' in the plates F and hold the plates G in their adjusted positions, pillow-blocks arranged to slide longitudinally in ways on the plates G, adjusting-screws carried by the plates G and engaging ears carried by the pillow-blocks for adjusting the latter in their ways, saw-arbors journaled in bearings carried by the pillow-blocks, and saws mounted on the saw-arbors, substantially as described.

5. In a sawing-machine, the combination with the machine-frame, of the fixed plates c secured to the frame and having straight, vertically-inclined ways, the ways of one plate converging toward the ways of the other plate, the plates F arranged to slide longitudinally in said ways, the plates G pivotally mounted at one end on the plates F, means for fastening the free ends of the plates G, pillow-blocks arranged to move longitudinally in ways on the plates G and provided with journal-boxes, saw-arbors C D journaled in said boxes and provided with saws, an intermediate arbor E and its saw, and means for vertically and angularly adjusting the saw-arbor E, substantially as described.

In testimony whereof I have hereunto set my hand.

CHARLES F. ROOD.

Witnesses:
W. R. WOOD,
E. E. WOOD.